C. F. JENKINS.
DEVICE FOR UNDER WATER EXPLORATION.
APPLICATION FILED DEC 16, 1914.
1,156,782.
Patented Oct. 12, 1915.
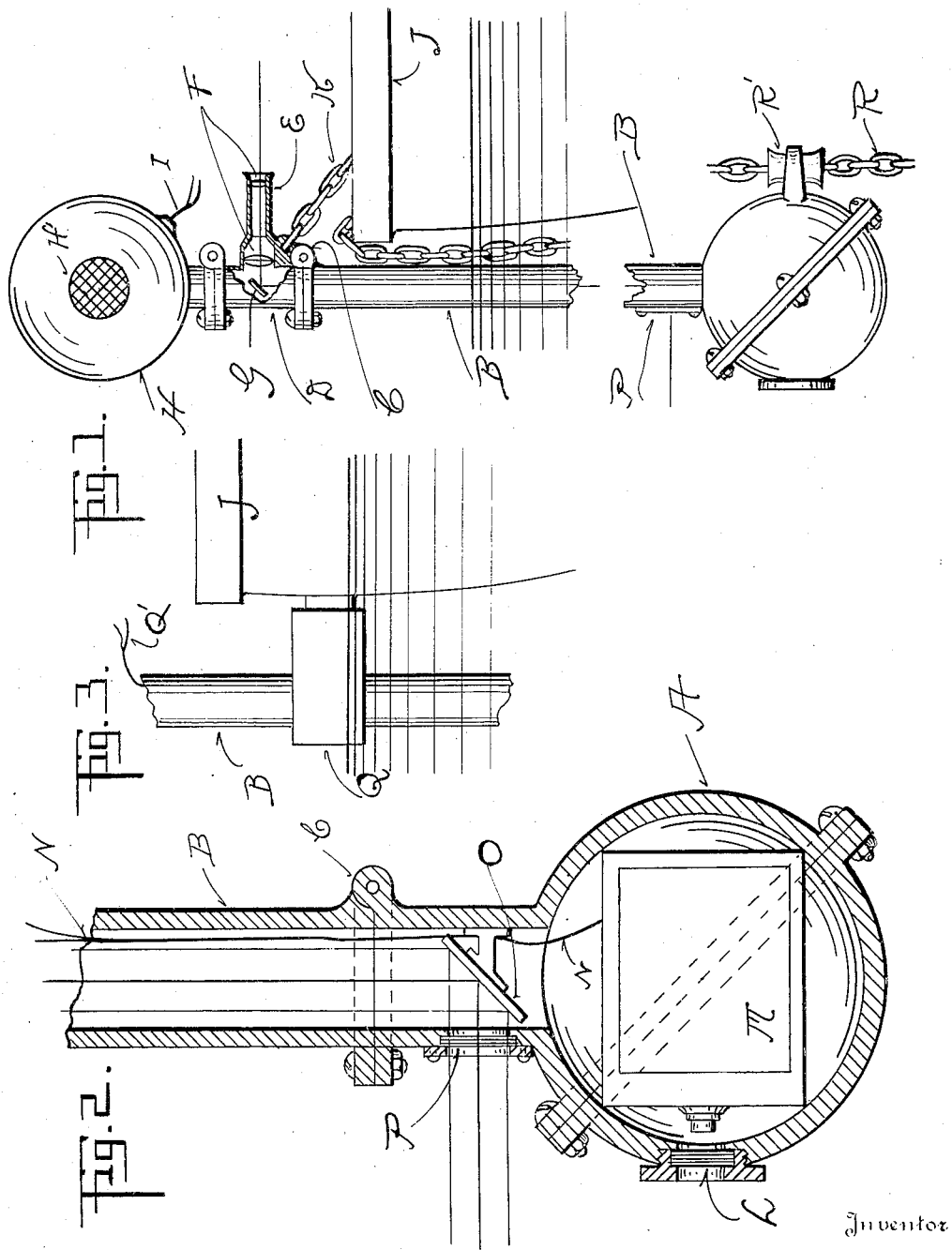
Witnesses
G. Love
J. R. White
Inventor
Charles Francis Jenkins

UNITED STATES PATENT OFFICE.

CHARLES FRANCIS JENKINS, OF WASHINGTON, DISTRICT OF COLUMBIA.

DEVICE FOR UNDER-WATER EXPLORATION.

1,156,782.            Specification of Letters Patent.       Patented Oct. 12, 1915.

Application filed December 16, 1914. Serial No. 877,594.

*To all whom it may concern:*

Be it known that I, CHARLES FRANCIS JENKINS, citizen of the United States, residing at 1808 Park road, Washington, District of Columbia, have invented certain new and useful Improvements in Devices for Under-Water Exploration, of which the following is a specification, reference being had therein to the accompanying drawing.

This invention relates to devices for making under-water explorations, as, for example, by direct vision or by photographing objects beneath the surface of the sea.

In the drawings accompanying these specifications Figure 1 is an elevation of one form of the apparatus, and one method of tethering it, say, by chains to a boat: Fig. 2 a sectional view of the lower end of the apparatus: and Fig. 3 a magnetic grip for securing it to the side of the boat.

In all the drawings like symbols refer to like parts, A being a working chamber at the lower end of a long, tubular member B made up of hinge-jointed sections, in number sufficient to attain the depth desired, and with gasketed or other water-tight joints. The top of this tubular member is a short section D having a lateral tube E containing lenses F in alinement with a small mirror G, the latter located also in alinement with the main tubular member B. Supported on the upper end of the member B is a globe H inclosing any suitable source of light, for example, an electric lamp, to which current is led through the wires I. The globe is open to the air through the grating H', and is also in free communication with the tubular section B, and therethrough with the working chamber A. The major parts of the device are preferably made of iron castings, or other suitable material, and so proportioned that the whole is buoyant, of comparatively light weight and therefore readily handled, and stored aboard the boat when not in use. Because of its buoyancy it is necessary to tether the device to the boat J by suitable means, as chains K. The working chamber is provided with one or more windows, L, behind which a camera M may be located. The camera, preferably fitted with a very large, fast-working lens, might be controlled from above water by electric means, through wires N, in the usual manner of such control from a distance. Above the camera a mirror O is located for reflecting laterally through the window P the rays of light projected downward through the tube from the source of light in the globe H. The light thus projected through the window P is employed for illuminating the object to be photographed, where such illumination is advantageous, as in muddy water or at great depths.

In order that the camera may be properly pointed so that the object to be photographed is kept within the field of the lens, a direct view of the object is had through the telescope E, the small reflecting mirror G and the large mirror O. The location of mirror G in the axis of the beam of light projected down the tube has not been found to perceptibly diminish the illumination of the object to be photographed. Thus an observer stationed at the eyepiece of the telescope E can keep the apparatus at the proper level and accurately pointed at the principal object. To assist in more securely attaching the device to the side of the vessel from which it is being operated it is sometimes desirable to more fixedly anchor the device to the side of the vessel, and a very convenient means of doing this is to mount an electromagnet Q on the tube at a greater or lesser distance down the vessel's side where it is plated with iron or steel. While I have not actually tried out a device of this character of sufficiently large dimensions to contain an operator in the working chamber it is possible to do so and still be within the scope of my invention. In certain localities, for illustration, where there is a strong tide running, it would be desirable to anchor its lower end to prevent its getting beyond control, and I have provided a chain R and anchor on the outside of the working end of the device for this purpose. To this anchor chain the submerged chamber is loosely held by the ring R' through which the chain passes.

What I claim, therefore, is—

1. A device for exploring under-water areas, consisting of a rigid tubular body of lighter weight than the water it displaces, and flexible means for holding it partially submerged when in use.

2. A device for exploring under-water areas, consisting of a rigid tubular body having an electro-magnet mounted thereon whereby it may be instantly attached or detached at any underwater point on the side of a ship afloat.

3. A device for exploring under-water areas, consisting of a rigid tubular body and flexible means for guiding it to, and securing it in, position for use.

In testimony whereof I have affixed my signature in presence of two witnesses.

CHARLES FRANCIS JENKINS.

Witnesses:
 JOSEPH ROGER WHITE,
 JAMES L. CRAWFORD.